United States Patent
Colonna et al.

(10) Patent No.: US 12,477,505 B2
(45) Date of Patent: *Nov. 18, 2025

(54) METHOD AND SYSTEM FOR DISTRIBUTING, ACROSS A TERRITORY, DATA AGGREGATED AT A MOBILE COMMUNICATION NETWORK CELL LEVEL

(71) Applicant: TELECOM ITALIA S.p.A., Milan (IT)

(72) Inventors: Massimo Colonna, Turin (IT); Piero Lovisolo, Turin (IT); Dario Parata, Turin (IT); Massimiliano Petra, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 507 days.

This patent is subject to a terminal disclaimer.

(21) Appl. No.: 17/999,624

(22) PCT Filed: May 18, 2021

(86) PCT No.: PCT/EP2021/063167
§ 371 (c)(1),
(2) Date: Nov. 22, 2022

(87) PCT Pub. No.: WO2021/239519
PCT Pub. Date: Dec. 2, 2021

(65) Prior Publication Data
US 2023/0239832 A1 Jul. 27, 2023

(30) Foreign Application Priority Data
May 28, 2020 (IT) .......... 102020000012730

(51) Int. Cl.
*H04W 64/00* (2009.01)
*H04W 68/00* (2009.01)
*H04W 68/10* (2009.01)

(52) U.S. Cl.
CPC ....... *H04W 64/003* (2013.01); *H04W 68/005* (2013.01); *H04W 68/10* (2013.01)

(58) Field of Classification Search
CPC . H04W 64/003; H04W 68/005; H04W 68/10; H04W 4/021; H04W 4/029
See application file for complete search history.

(56) References Cited

U.S. PATENT DOCUMENTS

| 2012/0115475 A1* | 5/2012 | Miyake | H04W 4/021 455/435.1 |
| 2013/0183927 A1* | 7/2013 | Scarr | H04W 4/029 455/405 |

OTHER PUBLICATIONS

International Search Report & Written Opinion issued Aug. 17, 2021 in PCT/EP2021/063167 filed on May 18, 2021, 15 pages.

(Continued)

*Primary Examiner* — Diane D Mizrahi
*Assistant Examiner* — Jing Gao
(74) *Attorney, Agent, or Firm* — Oblon, McClelland, Maier & Neustadt, L.L.P.

(57) ABSTRACT

A method distributes cell-level aggregated data available from a mobile communication network and aggregated at the level of single network cells. The method subdivides a geographic area in geographic area portions, and causes mobile terminals situated in the geographic area to calculate and provide respective geographic position estimates to a data processing system. An overall number of geographic position estimates are distributed by assigning to each geographic area portion a respective number of geographic position estimates. Cell-level aggregated data relating to a network cell is received, and for each network cell, covered (Continued)

geographic area portions are determined. The cell-level aggregated data of the network cell is distributed according to a respective distribution factor. A distribution map of the cell-level aggregated data is generated in which to each of the geographic area portions of the geographic area of interest a respective quota of the cell-level aggregated data is assigned.

11 Claims, 10 Drawing Sheets

(56) References Cited

OTHER PUBLICATIONS

Mamei et al., "Automatic identification of relevant places from cellular network data", Pervasive and Mobile Computing, vol. 31, 2016, pp. 147-158.

V. Soto, E. Frias-Martinez, "Robust land use characterization of urban landscapes using cell phone data", Workshop on Pervasive Urban Applications, 2011.

Calabrese et al. "Real-Time Urban Monitoring Using Cell Phones: A Case Study in Rome", IEEE Transactions On Intelligent Transportation Systems, vol. 12, No. 1, Mar. 2011, pp. 141-161.

Francesco Calabrese and Carlo Ratti, "Real Time Rome", Networks and Communications Studies, vol. 20, n° 3-4, pp. 247-258, 2006.

Caceres et al. "Exploring the Use of Urban Greenspace through Cellular Network Activity", 2nd Workshop on Pervasive Urban Applications (PURBA), Jun. 2012.

Deville et al. "Dynamic population mapping using mobile phone data", PNAS Nov. 11, 2014, 111 (45) 15888-15893: first published Oct. 27, 2014, available at https://doi.org/10.1073/pnas.1408439111.

Danya Bachir, "Estimating Urban Mobility with Mobile Network Geolocation Data Mining", Université Paris Saclay; https://theses.hal.science/tel-02046122v1, Feb. 22, 2019.

* cited by examiner

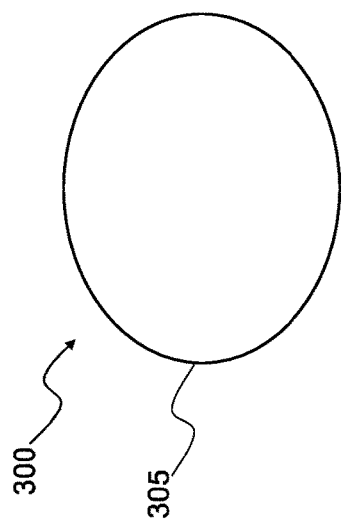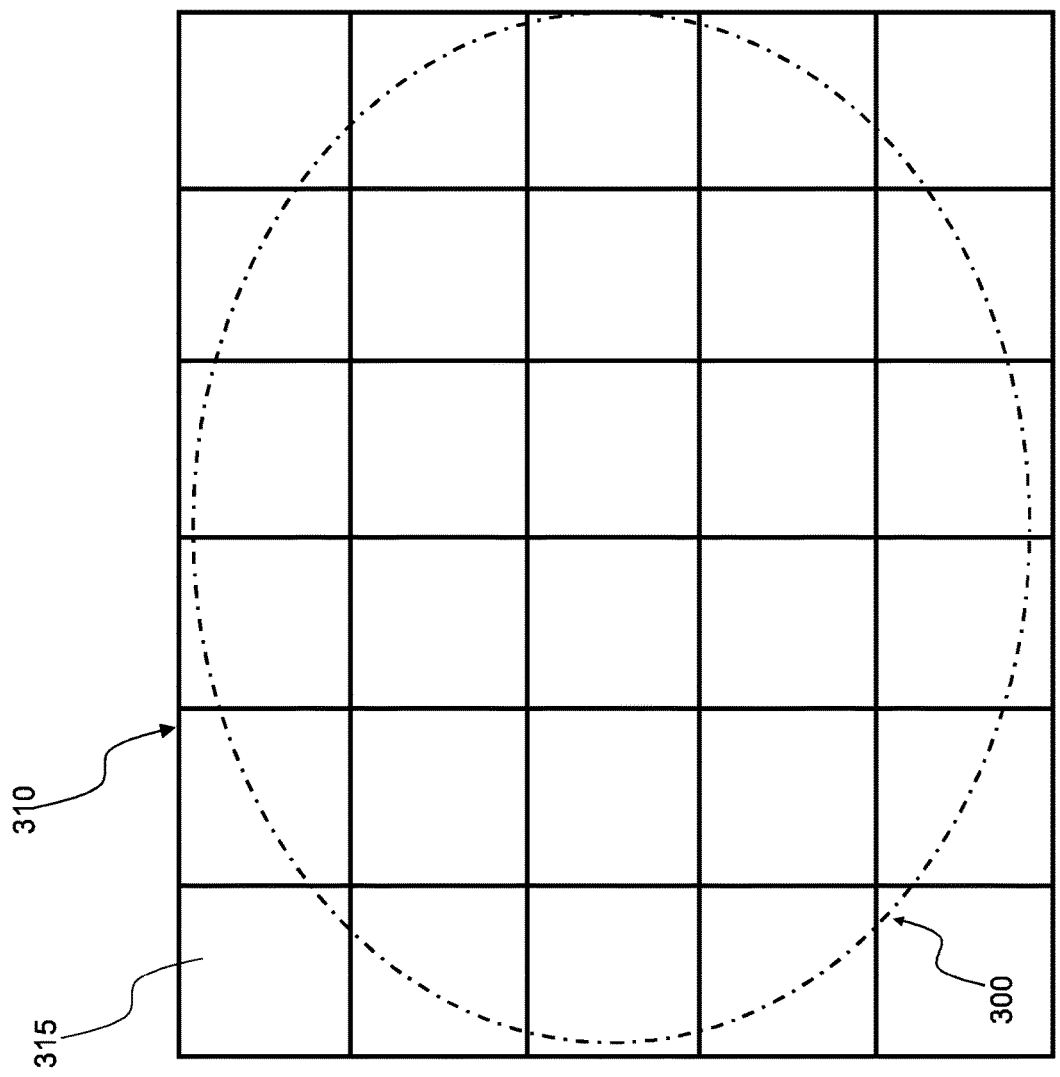
FIG.3A
FIG.3B

| cell_id | data_type | t_interval | cell_data_value |
|---------|-----------|------------|-----------------|
| $Id_1$ | $type_a$ | $t_\alpha$ | $value_{1a\alpha}$ |

405 cell_id; 410 data_type; 415 t_interval; 420 cell_data_value; 400a

FIG.4A

| UE_id | position (x, y) | timestamp |
|-------|-----------------|-----------|
| $UE\_Id_1$ | $pos_1$ | $ts_1$ |

425 UE_id; 430 position (x, y); 435 timestamp; 400b

FIG.4B

METHOD AND SYSTEM FOR DISTRIBUTING, ACROSS A TERRITORY, DATA AGGREGATED AT A MOBILE COMMUNICATION NETWORK CELL LEVEL

BACKGROUND OF THE PRESENT DISCLOSURE

Field of the Present Disclosure

The present disclosure generally relates to the field of mobile communications and mobile communication networks. More specifically, the present disclosure relates to a method, and a system, for the distribution across a territory of data aggregated at the level of cells of a mobile communication network.

Overview of the Related Art

Mobile phones (also referred to as cell phones, hand phones, mobile terminals, mobile stations, user equipment, and, for the purposes of the present disclosure, intended to include smartphones and tablets and, more generally, mobile communication devices with 2G-3G-4G-5G connectivity) have become an essential part of the everyday life of many—not to say, most—people. Due to this, it has been realized that mobile phones can expediently be used as sensors for monitoring the behaviour of communities of persons, to derive data useful for disparate purposes, inter alia:

for efficiently and effectively managing emergency situations (fires, natural disasters, terrorist attacks etc.);
for planning and managing public services on the territory, like transportation services, public security services, etc.;
for real-time supervising events, particularly events attended by a relevant number of individuals and, consequently, more exposed to potential risks;
for making advertisement and geomarketing campaigns more targeted on the territory, and
for monitoring the spread on the territory of viruses and epidemics.

WO 2013/107669 A1 discloses a method to automatically detect and label one or more points of interest (PoIs) of a user of mobile phone services, said method being based exclusively on geo-located phone usage information and with no customer interaction. Based on the geo-located usage events generated in the mobile phone, the mobile phone position at the network cell level and a timestamp indicating when the mobile phone comes into contact with the network during its normal activity (switch on/switch off, placing/receiving calls, sending/receiving SMSs, etc.) and data transiting on the different interfaces of the access and core network, like power and/or time measurements in uplink/downlink, handovers (both successful and unsuccessful) when entering/leaving network cells, placed/dropped calls, etc., and data stored in the counters of the O&M system of the networks and related to the access and core network apparatuses.

The network operator has thus available a number of pieces of information or data, aggregated at the network cell level (like for example number of users per cell, number of calls per cell, call load per cell, e.g. in Erlang, number of in/out handovers per cell, etc.) with the associated timestamps.

The Applicant has observed that, due to the area extension of the cells (which typically have coverage radiuses of several hundreds of meters in dense urban areas, few/some kilometers in suburban areas and tens of kilometers in rural areas) these aggregated data, to be useful for practical applications on the territory, need to be translated from the network cell level to the geographic level, by means of some distribution function.

In technical literature some methods are described for distributing across the territory data available (i.e., aggregated) at the network cell level.

In Francesco Calabrese, Carlo Ratti, "Real Time Rome", Networks and Communications Studies Vol. 20 N. 34, pages 247-258, 2006, it is shown that important events like the concert of the popstar Madonna held in Rome in August 2006, or the parade of the Italian national soccer team after winning the soccer world championship in 2006, also held in Rome, can be detected through the telephonic traffic ("intensity of mobile phone calls") collected during the events by the cells of the mobile communication network. The paper reports that the territory has been subdivided in square pixels of 40 m side each and, for distributing onto these pixels the aggregated data available at the network cell level, an exponential distribution function has been exploited. Consequently, farther pixels are assigned an intensity value lower than the intensity value assigned to closer pixels. In each pixel possibly covered by more than one network cell, the contribution of each such cell is summed up to obtain the final value of intensity.

In V. Soto, E. Frias-Martinez, "Robust land use characterization of urban landscapes using cell phone data", Workshop on Pervasive Urban Applications, 2011, a method is described for automatically identifying land uses from call detail record databases. The whole area under evaluation (e.g., a region, a city, etc.) is subdivided in smaller areas through Voronoi Diagrams (http://en.wikipedia.org/wiki/Voronoi_diagram). Such a Voronoi tessellation is achieved starting from the locations of the radio base stations of the mobile communication network. To each tile of the tessellation a network cell is univocally associated and, consequently, each tile is assigned the whole value of the aggregated data available at the network cell level (number of calls that are managed by that Base Transceiver Station—BTS—over a period of time). Thus, a uniform distribution of the data available at the cell level onto the corresponding tile is achieved.

In Ramon Caceres, James Rowland, Christopher Small, and Simon Urbanek, "Exploring the Use of Urban Greenspace through Cellular Network Activity", 2nd Workshop on Pervasive Urban Applications (PURBA), June 2012, anonymous records of cellular network activity ("counts of voice calls and text messages") are used to study the spacetime patterns of human density in an urban area. In that work, when building Voronoi Diagrams, account is also taken of the directionality of the antennas installed at the radio base stations, thus the different tiles cover a smaller area compared to the previously mentioned paper.

In Pierre Deville, Catherine Linard, Samuel Martin, Marius Gilbert, Forrest R. Stevens, Andrea E. Gaughan, Vincent D. Blondel, and Andrew J. Tatem, "Dynamic population mapping using mobile phone data", PNAS Nov. 11, 2014 111 (45) 15888-15893; first published Oct. 27, 2014, available at https://doi.org/10.1073/pnas.1408439111, it is shown how spatially and temporally explicit estimations of population densities can be produced at national scales, and how these estimates compare with outputs produced using alternative human population mapping methods. It is also demonstrated how maps of human population changes can be produced over multiple timescales while preserving the anonymity of MP users. The aggregated data at the level of the j-th network cell ("total number of different users Tj") is distributed onto any i-th area ai by:

1) considering the Voronoi polygon vj corresponding to the j-th cell (calculated in standard way as described in http://en.wikipedia.org/Voronoi_diagram);
2) distributing the data Tj uniformly over the whole polygon vj;
3) detecting the intersection between the polygon and the area ai, and then
4) uniformly distributing the users on such intersection.

Consequently, the wider the intersection the greater the quota of the aggregated data of the j-th cell distributed on the area ai.

In Danya Bachir, "Estimating Urban Mobility with Mobile Network Geolocation Data Mining", Thèse de doctorat de l'Université Paris-Saclay préparée à IRT System X, Bouygues Telecom, Télécom SudParis. Ecole doctorale n°1 Sciences et technologies de l'information et de la communication (STIC); Spécialité de doctorat: Réseaux, information et communications; thesis presented and discussed at Gif-sur-Yvette on 25 Jan. 2019, urban mobility is estimated by mining mobile network data, which are collected in real-time by mobile phone providers at no extra-cost. Processing the raw data is non-trivial as one must deal with temporal sparsity, coarse spatial precision and complex spatial noise. The thesis work addresses two problematics through a weakly supervised learning scheme (i.e., using few labelled data) combining several mobility data sources. First, population densities and number of visitors over time are estimated, at fine spatio-temporal resolutions. Second, Origin-Destination matrices are derived representing total travel flows over time, per transport modes. All estimates are exhaustively validated against external mobility data, with high correlations and small errors. The distribution of the aggregated data at the level of the j-th cell ("total number of different users Tj") is distributed on any i-th area ai taking into account two factors: on one side, as in the preceding work, there is an intersection between the Voronoi polygon of the j-th cell and the area ai, on the other side there is the population density ("census population") in the area ai: the greater the population density, the greater the quota of aggregated data of the j-th cell that is distributed on the area ai.

SUMMARY OF THE PRESENT DISCLOSURE

The Applicant has observed that the known methods for distributing the aggregated data available at the network cell level on the territory are not satisfactory.

The Applicant has observed that the results obtained by applying the exponential distribution rule adopted in the abovementioned work "Real Time Rome" by Francesco Calabrese et al. are in no way correlated to the actual location of the users on the territory.

Concerning the abovementioned work "Robust land use characterization of urban landscapes using cell phone data" by V. Soto et al., the Applicant observes that also this distribution gives results that are in no way correlated with the actual position of the users on the territory, which is more coarsely approximated the wider the tiles (i.e., the cells) dimensions.

In respect of the abovementioned work "Exploring the Use of Urban Greenspace through Cellular Network Activity" by Ramon Caceres et al., the Applicant has observed that in practical situations the size of the network cells, i.e. the size of the tiles, is such to make the proposed model unrealistic. Similar considerations apply to the method proposed in the abovementioned work "Dynamic population mapping using mobile phone data" by Pierre Deville et al.: the proposed model, still based on a uniform distribution, is unrealistic.

The Applicant has observed that in several activities of planning and managing of services offered to the population, particularly activities of management of emergencies and security, as well as activities of marketing and promotion (e.g., poster advertising), and also for O&M of mobile communication networks, it is important to distribute the aggregated data available at the network cell level (e.g., the number of users per cell, the number of calls per cell, the intensity of the phone traffic per cell, e.g. in Erlang, the number of inbound/outbound handovers per cell, etc., just to mention some of the possible aggregated data) on the territory, as accurately as possible, even on very small scales (e.g., some tens of meters).

Contrary to this, as mentioned a few lines above, works available in the technical literature disclose distribution methods that are unrealistic and source of gross errors.

In particular the Applicant observes that all the five works mentioned in the foregoing describe simple and easy to implement in software methods of distribution of the aggregated data at the network cell level on the territory, but, at the same time, such methods are based on an hypothesis of uniform/exponential distribution that is unrealistic: in everyday life the users of the mobile communication network are not uniformly/exponentially distributed on the territory with respect to network cells or radio sites. This causes gross errors when one is interested in knowing the data at a local level, at a scale smaller or even much smaller than that of the network cell size, as requested by the practical applications mentioned before.

Moreover, a more correct and more realistic distribution of the aggregated data at the cell level on the territory is of great importance also for O&M activities of the mobile communication network itself, for monitoring the performance and the Quality of Service provided to the users, for detecting and solving problems of coverage, connection, etc.

The Applicant believes that there is the need of overcoming these problems by defining a new method for distributing, across the territory, the aggregated data available at the mobile communication network cell level ("cell-level aggregated data"), suitable to reflect the actual geographic position of the individuals on the territory, and that can be expediently used also for scales much smaller than the size of the network cells.

The Applicant has found that this goal can be achieved starting from a certain number of estimates of position that a properly selected set of mobile terminals perform and send to a central server. These position estimates, distributed on tiles of a tessellation that covers the geographic area across which the cell-level aggregated data have to be distributed, allow calculating a general distribution map, which establishes a correspondence between each tile of the tessellation and the number of position estimates falling within it. From this general distribution map, by considering the cell coverage of a generic network cell, and thus the specific tiles that fall within such a cell, a cell-specific distribution map is obtained for that cell, in which each tile corresponds to a respective aggregated cell-level data distribution factor for such a tile.

According to an aspect of the present disclosure, there is provided a method, implemented by a data processing system, for distributing, across a territory, cell-level aggregated data, said cell-level aggregated data being data which are available from a mobile communication network in a form that is aggregated at the level of single network cells of the mobile communication network.

The method comprises:

subdividing a geographic area of interest in geographic area portions;

causing mobile communication terminals served by the mobile communication network and situated in the geographic area of interest to calculate respective geographic position estimates and provide the calculated geographic position estimates to the data processing system;

distributing an overall number of geographic position estimates received from the mobile communication terminals on the geographic area portions by assigning to each geographic area portion a respective number of geographic position estimates corresponding to geographic positions estimates falling within said geographic area portion;

receiving cell-level aggregated data relating to at least one network cell;

for each of said at least one network cell:

determining, among said geographic area portions, covered geographic area portions falling within a coverage area of said network cell;

distributing the cell-level aggregated data of the network cell on each of the determined covered geographic area portions according to a respective distribution factor which depends on said respective number of geographic position estimates assigned to the covered geographic area portion, and generating a distribution map of the cell-level aggregated data in which to each of said geographic area portions of the geographic area of interest a respective quota of the cell-level aggregated data is assigned, said respective quota being obtained by said distributing the cell-level aggregated data of the network cell on each of the determined covered geographic area portions according to the respective distribution factor.

In embodiments, the cell-level aggregated data may comprise at least one among: number of users of mobile communication terminals in the network cell, phone traffic in the network cell, number of calls in the network cell.

In embodiments, the cell-level aggregated data may comprise at least one among:

an aggregated cell-level counter of the mobile communication network of the traffic carried by the individual network cell;

an aggregated cell-level counter of the mobile communication network of the number of new calls established through the individual network cell;

an aggregated cell-level counter of the mobile communication network of the number of new calls received at the individual network cell;

an aggregated cell-level counter of the mobile communication network of the overall number of SMS messages received and transmitted in the individual network cell;

an aggregated cell-level counter of the mobile communication network of the number of SMS messages received at the individual network cell;

an aggregated cell-level counter of the mobile communication network of the number of SMS messages transmitted in the individual network cell;

an aggregated cell-level counter of the mobile communication network of the number of "location update" procedures carried out in the individual network cell;

an aggregated cell-level counter of the mobile communication network of the number of successful handovers in exit from a generic network cell towards each of the adjacent cells;

an aggregated cell-level counter of the mobile communication network of the number of successful handovers in entrance in a generic network cell from each of the adjacent cells.

In embodiments, the cell-level aggregated data may comprise data obtained by aggregating Call Data Records, which derive from interactions of the mobile communication terminals with the mobile communication network, said data obtained by aggregating Call Data Records comprising:

total number of users present in a network cell, possibly discriminated by their nationality;

number of users having residence/domicile/working place inside a network cell;

number of users in a network cell, possibly discriminated by their nationality, that can be classified as tourists/walkers or in transit through the cell;

number of users in a network cell, possibly discriminated by their nationality, that can be classified as "Machine-to-machine" users, on the basis of parameters of the mobile communication terminals;

number of users in a network cell, possibly discriminated by their nationality, that can be classified as "individuals/human beings", on the basis of parameters of the mobile communication terminal.

In embodiments, the causing mobile communication terminals served by the mobile communication network and situated in the geographic area of interest to calculate respective geographic position estimates and provide the calculated geographic position estimates to the data processing system may comprise selecting, among all the mobile communication terminals served by the mobile communication network and situated in the geographic area of interest, a subset of selected mobile communication terminals according to a selection criterion comprising at least one among:

mobile communication terminals of users which have given their consent to activate their geographic localization;

mobile communication terminals of users which have given their consent to take part to measurement campaigns to be performed for purpose of distributing, across a territory, cell-level aggregated data;

mobile communication terminals of users which, at subscription, have declared a residence in a certain area inside the geographic area of interest;

mobile communication terminals of users in respect of which an operator of the mobile communication network has determined a residence or a working location in a certain area inside the geographic area of interest.

In embodiments, the method may comprise configuring the subset of selected mobile communication terminals, said configuring comprising providing to the selected mobile communication terminals at least one among:

an indication of a time interval during which the selected mobile communication terminals will have to calculate the respective geographic position estimates;

an indication of a periodicity with which the selected mobile communication terminals will have to calculate the respective geographic position estimates;

an indication of whether the selected mobile communication terminals will have to provide to the data processing system the respective calculated geographic position estimates immediately after the respective geographic position estimates have been calculated or the respective calculated geographic position estimates can be provided to the data processing system at a later time after they have been calculated.

In embodiments, the determining covered geographic area portions falling within a coverage area of that network cell may comprise:
- obtaining a coverage area of that network cell;
- determining which of said geographic area portions belong to the coverage area of the network cell, wherein said determining comprises at least one among:
- assessing which of said geographic area portions have geographic coordinates of a center of gravity thereof falling inside the coverage area of the network cell;
- assessing which of said geographic area portions fall, for a given percentage of their area, inside the coverage area of the network cell.

In embodiments, the assigning to each geographic area portion a respective number of geographic position estimates corresponding to geographic positions estimates falling within said geographic area portion may comprise, in case a geographic position estimate falls on a boundary between at least two geographic area portions:
- either randomly selecting one of the at least two geographic area portions to be assigned to that geographic position estimate,
- or assigning to each of said at least two geographic area portions a fraction of said geographic position estimate equal to 1 divided by the number of said at least two geographic area portions.

In embodiments, the cell-level aggregated data may be received in the form of t-uples, wherein each t-uple may comprise a field containing an identifier of the network cell to which the aggregated data refers, a field containing an indication of a time interval to which the aggregated data is referred, a field containing the value of the aggregated data in said time interval, and optionally a field containing an indication of the nature, type of the aggregated data.

In embodiments, the calculated geographic position estimates may be provided in the form of t-uples, wherein each t-uple may comprise: a field containing an indication of the geographic position estimated by the mobile communication terminal, expressed in any system of geographic coordinates, a field containing an indication of the time instant at which the geographic position estimate has been calculated, optionally a field containing an indication of a univocal identifier of the mobile communication terminal that calculated and sent the geographic position estimate.

According to another aspect of the present disclosure, a data processing system comprising modules configured to perform, when operated, the method of the previous aspect.

Thanks to the solution according to the present disclosure, it is possible to obtain a distribution, across a territory, of the aggregated data available at the mobile communication network cell level which more closely reflects the actual geographic position of the individuals on the territory, and that can be expediently used also for scales much smaller than the size of the network cells.

BRIEF DESCRIPTION OF THE ANNEXED DRAWINGS

These and other features and advantages of the solution according to the present disclosure will be better understood by reading the following detailed description of embodiments thereof, provided merely by way of non-limitative example, to be read in conjunction with the attached drawings, wherein:

FIG. 1 schematically depicts a system according to an embodiment of the present disclosure for distributing aggregated cell-level data across a territory;

FIG. 2 schematically depicts a component (referred to as Localization Manager) of the system of FIG. 1;

FIG. 3A schematically depicts a geographic area on which the aggregated cell-level data has to be distributed;

FIG. 3B shows an exemplary tessellation for subdividing in tiles the geographic area on which the aggregated cell-level data has to be distributed;

FIG. 4A shows an exemplary format of quadruples containing the aggregated cell-level data to be distributed on the geographic area;

FIG. 4B shows an exemplary format of position estimates calculated by mobile phones (also referred to as User Equipment, UE) and provided to the system;

DETAILED DESCRIPTION OF EXEMPLARY EMBODIMENTS OF THE PRESENT DISCLOSURE

Figure 1:
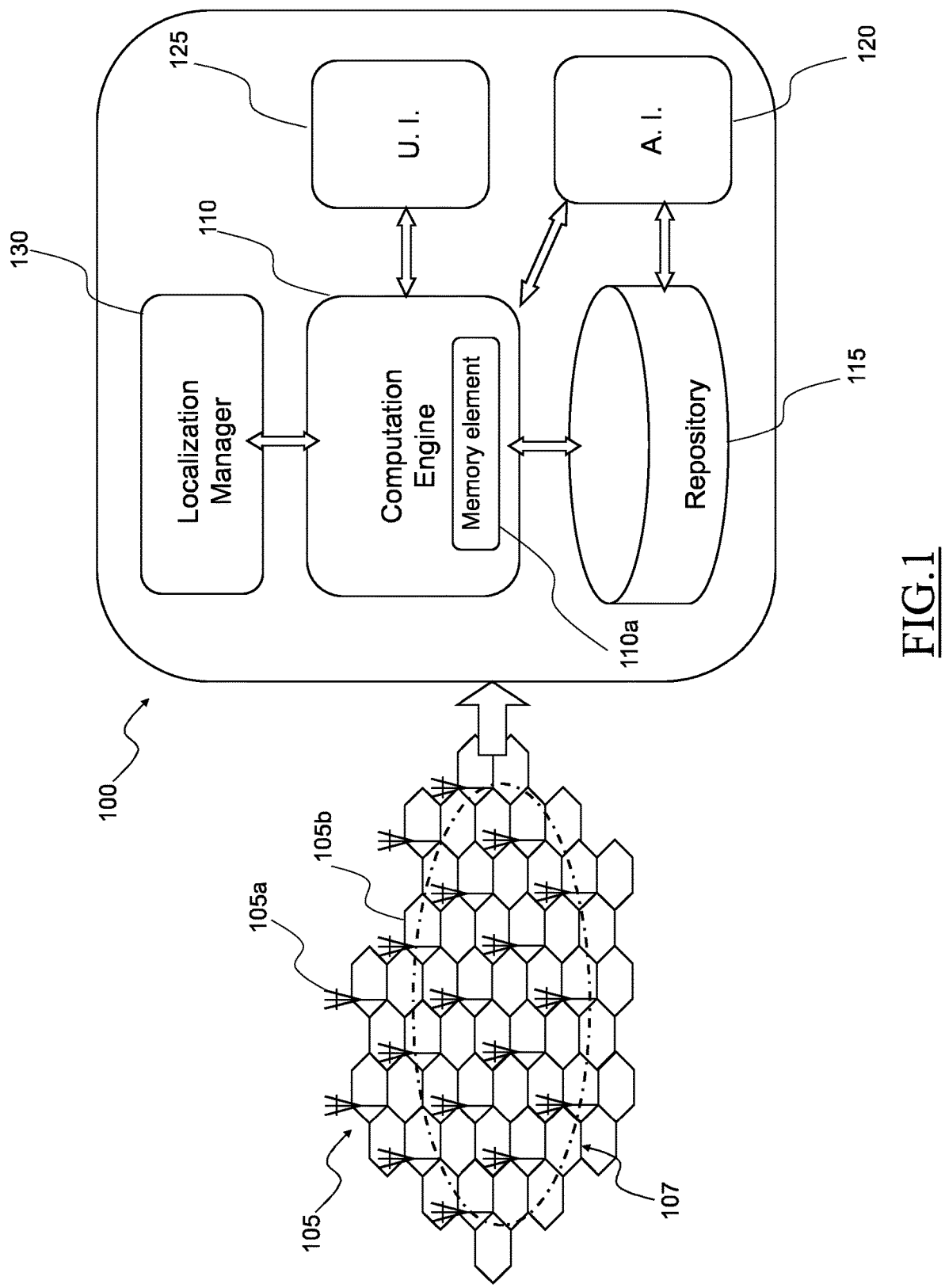

With reference to the drawings, FIG. 1 is a schematic representation of a system 100, according to an exemplary embodiment of an aspect of the present disclosure, for the distribution, on a territory, of aggregated data available at a mobile communication network cell level (hereafter, for conciseness, also referred to as "aggregated cell-level data").

By aggregated cell-level data it is meant data which are available to an operator of a mobile communication network in a form that is aggregated at the level of the single mobile communication network cells. The aggregated cell-level data may for example be the values of one or more counters and/or derive from the combination of the values of several different counters. Manufacturers of mobile communication network apparatus usually define and implement (several) proprietary counters, which may be different for different mobile communication technologies (e.g., 2G, 3G, 4G, 5G). In general, the data available at all the levels of a mobile communication network are designed and intended to allow performing network monitoring, network performance monitoring and troubleshooting. In the practice, such data are obtained through counters at a very fine detail, since they track messages and data packets of the communication protocols between mobile communication network apparatuses.

Mobile communication network operators may use the proprietary counters implemented by the manufacturers of mobile communication network apparatuses and/or define and implement other counters which are the combination of selected proprietary counters implemented by the manufacturers of mobile communication network apparatuses, to obtain counters which provide data aggregated at the single mobile network cells ("aggregated cell-level counters"). Such aggregated cell-level data may for example include aggregated cell-level data which are indicative, directly or indirectly, of the distribution on the territory of a population, such as number of users in the cell, phone traffic in the cell, number of calls in the cell.

For example, aggregated cell-level counters that can be defined and implemented by a mobile communication network operator may include (the list is not to be intended as exhaustive and limitative: other aggregated cell-level counters can be defined and implemented):

Traffic_Erl: an aggregated cell-level counter of the carried traffic, carried at regular time intervals (e.g. 5, 10, 15 minutes);

New_Speech_Calls: an aggregated cell-level counter of the number of new calls (received and set-up) established through a network cell, at regular time intervals;

Terminating New_Speech_Calls: an aggregated cell-level counter of the number of new calls received at the cell, at regular time intervals;

Originating New_Speech_Calls: an aggregated cell-level counter of the number of new calls established by the network cell, at regular time intervals;

SMS: an aggregated cell-level counter of the overall number of SMS messages (received and transmitted) in the network cell, at regular time intervals;

Terminating_SMS: an aggregated cell-level counter of the number of SMS messages received at the network cell, at regular time intervals;

Originating_SMS: an aggregated cell-level counter of the number of SMS messages transmitted in the network cell, at regular time intervals;

locUpdate: an aggregated cell-level counter of the number of "location update" procedures (periodical and non-periodical) carried out in the network cell, at regular time intervals (as known, the "location update" procedure is a procedure that allows a mobile communication device to inform the cellular network whenever it moves from one location area to the next);

Handover_Out: an aggregated cell-level counter of the number of successful handovers in exit from a network cell towards each of the adjacent cells, at regular time intervals;

Handover_In: an aggregated cell-level counter of the number of successful handovers in entrance in a network cell from each of the adjacent cells, at regular time intervals.

Another category of aggregated cell-level data includes data obtained by properly aggregating "Call Data Records" ("CDRs") or "event records", collected e.g. for accounting/billing purposes, which derive from the interactions of the users of the mobile communication network and the mobile communication network. These event records, processed by means of suitable algorithms allow obtaining several types of aggregated cell-level data. For example, the following aggregated cell-level data can be obtained from the event records (the list is not to be intended as exhaustive and limitative: other aggregated cell-level data can be obtained from the event records), at regular time intervals (e.g. 5, 10, 15 minutes):

Total number of users present in a network cell, possibly discriminated by their nationality;

Number of users having residence/domicile/working place inside the network cell (the residence/domicile/working place can be determined for example by means of an algorithm such as that described in M. Mamei, M. Colonna, M. Galassi, "Automatic Identification of Relevant Places from Cellular Network Data", Pervasive and Mobile Computing, Vol. 31, pp. 147-158, September 2016, ISSN: 1574-1192, doi: 10.1016/j.pmcj.2016.01.009);

Number of users in the network cell (possibly discriminated by their nationality) that can be classified as tourists/walkers or in transit through the cell (such classification of the users can for example be made using an algorithm such as that described in M. Mamei, M. Colonna, "Analysis of Tourist Classification from Cellular Network Data", Journal of Location Based Services, April 2018, ISSN: 1748-9725 (Print) 1748-9733 (Online), doi: 10.1080/17489725.2018.1463466);

Number of users in the network cell (possibly discriminated by their nationality) that can be classified as "Machine-to-machine" users (this classification can be made on the basis of some known parameters of the mobile communication terminal);

Number of users in the network cell (possibly discriminated by their nationality) that can be classified as "individuals/human beings" (also this classification can be made on the basis of some known parameters of the mobile communication terminal).

The exemplary aggregated cell-level data derived from the "event records" listed above can further be combined together (for example, to obtain aggregated cell-level data about the number of users, possibly discriminated by their nationality, classified as tourists and whose residence/domicile/working place is situated within a cell or within a certain area) or combined with other parameters (e.g., the number of users, possibly discriminated by their nationality, classified as tourists or walkers or in transit and that, previously or successively, have visited/stayed one or more nights in a certain network cell).

The system 100 is coupled with a mobile communication network 105, such as a (2G, 3G, 4G, 5G or higher/other generation) mobile telephony network covering a geographic area (in the following also referred to, shortly, as "area" or "surveyed area") pictorially delimited by and within the dash-and-dot line 107. The area 107 can for example be a city, a municipality, a district, etc. The system 100 is configured to distribute the aggregated cell-level data across the area 107.

The mobile communication network 105 comprises a plurality of (two or more) radio base stations 105a geographically distributed in the surveyed area 107. Each base station 105a is adapted to manage communications of User Equipment (UE, not shown, such as for example mobile phones, smartphones, tablets with 2G-3G-4G-5G or higher/other connectivity, etc.) in one or more served areas or network cells 105b (in the example at issue, three cells are assumed to be served by each base station 105a).

Each radio base station 105a of the mobile communication network 105 is configured to interact with any UE located within one of the cells 105b served by such radio base station 105a (e.g., interactions include interactions at UE power on/off, at location area update, at incoming/outgoing calls, at sending/receiving SMS and/or MMS, at Internet accesses, etc.).

The surveyed area 107 may be regarded as subdivided in a plurality of sectors, each one corresponding to a respective cell 105b of the (part of the) mobile communication network 105 superimposed on the surveyed area 107.

The system 100 comprises a Computation Engine 110 configured to be adapted to perform the operation of distribution of the aggregated cell-level data on the territory.

The system 100 comprises a Repository 115 (such as a database, a file system, etc.) configured to be adapted to store the aggregated cell-level data that have to be distributed on the area 107, for one or more cells 105b of the mobile communication network 105. The Repository 115 can be configured to be adapted to store computation results generated by the Computation Engine 110. The Repository 115 can be configured to be adapted to store any processing data generated by and/or provided to the system 100 (generally in a binary format).

The data stored in the Repository 115 include data about the coverage (coverage data) of the cells 105b of the mobile communication network 105. For the purposes of the present disclosure, the way in which the coverage data are expressed is not relevant: the coverage of a cell can indifferently be expressed by way of the geographic coordinates of the center and the radius of a circle defining the coverage area, or by way of areas delimited by polygons, regular or irregular, with any number of sides, or by way of the union of square pixels, joint or separated. Additionally, the present disclosure does not depend of the way adopted for the computation of the coverage of cells, so that it is possible to exploit, indifferently, both simplified electromagnetic field propagation models (such as those described in Theodore S. Rappaport, "Wireless Communications", Prentice Hall, 1996, Chapter 3 and Chapter 4, pages 69-196) and mobile network planning tools normally exploited by mobile communication network operators. Moreover, the coverage of the network cells can indifferently be calculated specifically, ad-hoc for the system 100 before the start of the operation of the system 100, or be coverage data already available to the operator of the mobile communication network 105 for the network planning.

The system 100 is provided with an Administrator Interface (A.I.) 120 (e.g., implemented in a computer) configured and operable for modifying parameters and/or algorithms used by the Computation Engine 110 and/or accessing data stored in the Repository 115.

The system 100 may comprise one or more User Interface(s) (U.I.) 125 (e.g., a user terminal, or a software running on a remote terminal connected to the system 100) configured to be adapted to receive inputs from, and to provide output to a user of the system 100. The term "user" as used in the present disclosure may refer to one or more human beings and/or to external computing systems (such as a computer network, not shown) of a third party being subscriber of the services provided by the system 100 and enabled to access the system 100—e.g., under subscription of a contract with a service provider owner of the system 100, and possibly with reduced right of access to the system 100, limited compared to the right of access held by an administrator of the system 100 operating through the Administrator Interface 120.

Figure 2:
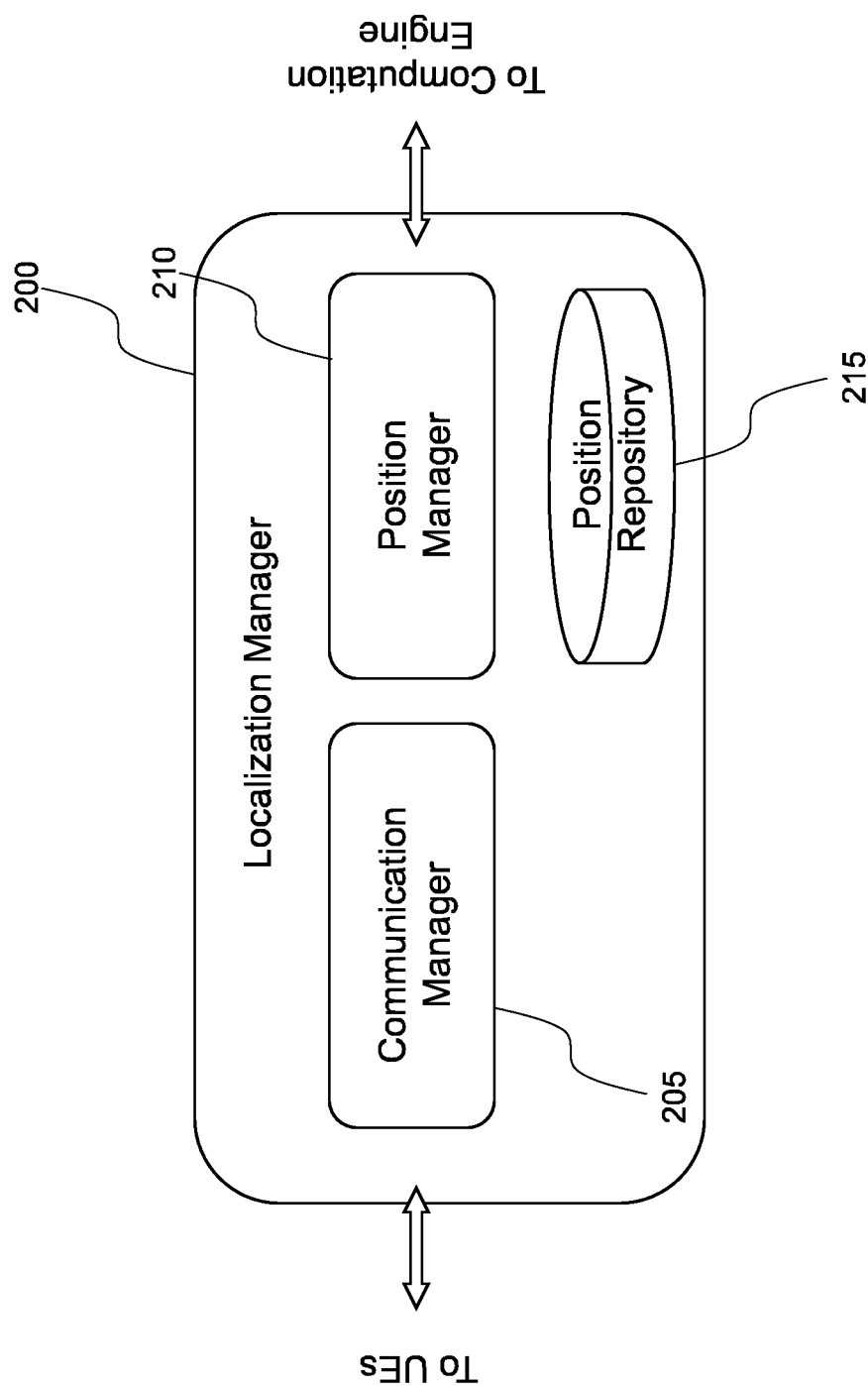

The system 100 comprises a Localization Manager 130, shown in greater detail as 200 in FIG. 2, from a logical viewpoint. The Localization Manager 200 comprises a Communication Manager 205 and a Position Manager 210.

The Communication Manager 205 is configured to be adapted to manage the communications with the UE (possibly, with a subset of all the UE) located in the surveyed area 107, particularly for transferring to the UE configuration parameters of the system (as described in detail later on). The Position Manager 210 is configured to be adapted to receive position estimates, with related timestamps, calculated and sent by the UE, and to transfer the received position estimates and timestamps, when needed, to the Computation Engine 110, for the processing by an algorithm for the distribution of the aggregated cell-level data across the territory.

The Localization Manager 200 can also include a Position Repository 215 (such as a database, a file system, etc.) in which the position estimates (and related timestamps) provided by the UE to the system 100 are stored. The Position Repository 215 can also be physically integrated in the Repository 115, if suitable (e.g., in case the Localization Manager 200 is physically integrated with the other components of the system 100 or when the transfer of data between the Localization Manager 200 and the Repository 115 can be accomplished quickly without causing delays on the processing operations).

The Localization Manager 200 is configured to be adapted to communicate with the UE through the mobile communication network 105. However, for the purposes of the present disclosure the specific way in which the communication between the Localization Manager 200 and the UE is accomplished, and the protocols adopted therefore, are not limitative. The dialogue between the Localization Manager 200 and the UE can for example take place through the User-plane, e.g., using communication protocols of the Internet world (like the TCP/IP), in a way totally similar to what normally happens between a terminal and a remote server, or through the Control-plane, encapsulating the messages exchanged between the Localization Manager 200 and the UE in signaling messages that apparatuses of the mobile communication network 105 exchange for performing their specific operations.

The system 100 can be implemented in any known manner; for example, the system 100 can comprise a single computer, or a network of distributed computers, either of physical type (e.g., with one or more main machines implementing the Computation Engine 110 and the Repository 115 connected to other machines implementing Administrator and User Interfaces 120 and 125) or of virtual type (e.g., by implementing one or more virtual machines in a network of computers).

Additionally, some modules and/or functionalities of the system 100, such as the Localization Manager 200, can be part of, implemented in, the mobile communication network 105 or possibly be implemented in some apparatuses of the mobile communication network 105 or in the O&M system thereof. The different functionalities of the Localization Manager 200 can be implemented in different apparatuses, depending on the specific necessities of the mobile communication network operator and/or administrator of the system 100 (costs, availability of apparatus, available communication bandwidth for the links, etc.).

The Computation Engine 110 is configured to be adapted to execute an algorithm (described in the following) for distributing the aggregated cell-level data across the area 107, implemented by a software program product stored in a Memory Element 110a of the system 100, comprised in the Computation Engine 110 in the example of FIG. 1, even though the software program product could be stored in the Repository 115 as well (or in any other memory element, not shown, provided in the system 100).

The aggregated cell-level data can be processed according to (as discussed in detail in the following) instructions provided by the system administrator (through the Administrator Interface 120), for example stored in the Repository 115, and, possibly, according to instructions provided by a user of the system 100 (through the User Interface 125).

The Computation Engine 110 may provide the results of the processing performed on the aggregated cell-level data to the user of the system 100 through the User Interface 125, and, optionally, the Computation Engine 110 may be configured to store such processing results in the Repository 115.

FIG. 3A schematically depicts the surveyed geographic area 107, in the following referred to as Region of Interest (RoI) and identified as 300, as the area within the ellipsis delimited by a boundary, or external cordon 305 (which is assumed to delimit the RoI 300). In FIG. 3B the boundary 305 of the RoI 300 is depicted in dash- and dot line. It is pointed out that the elliptical shape of the RoI 300 shown in FIGS. 3A and 3B is merely exemplary and not limitative: any other shape is possible.

The RoI 300 is a geographic region within which the aggregated cell-level data are to be distributed by the system 100. For example, the RoI 300 may be either a district, a town, a city, or any other kind of geographic area. Moreover, the RoI 300 may comprise a number of sub-regions including non-adjacent geographical locations, such as for example a plurality of different cities, different counties and/or different nations (and so on). In addition, the RoI 300 may comprise a set of one or more predetermined locations (such as for example airports, bus/train stations, etc.).

The RoI 300 is completely tessellated by a tessellation 310, as shown in FIG. 3B, and the result of the operations carried out by the system 100 is the distribution of the cell-level data on the different tiles 315 of the tessellation 310. For the sake of simplicity, a tessellation 310 with square tiles 315 all of equal size has been chosen, but for the purposes of the present disclosure, the shape of the tiles 315 of the tessellation 310 is irrelevant; for example, instead of square tiles, triangular or polygonal tiles can be used. The size of the tiles is not limited to a specific value (the size of the tiles only determines the spatial resolution of the output produced by the system 100).

The tessellation 310 of the RoI 300 is independent from the coverage of the RoI 300 by the network cells of the mobile communication network 105: there is no relationship between the tiles 315 and the (coverage area of the) network cells 105b.

The tessellation 310 is for example input by the administrator of the system 100 through the Administrator Interface 120.

The aggregated cell-level data to be distributed by the system 100 on the tessellation 310 of the RoI 300 can be arranged in t-uples. For example, as shown in FIG. 4A, the cell-level data can be arranged in quadruples 400a of the type q=(cell_id, data_type, t_interval, cell_data_value), where:
- the field cell_id 405 of the quadruple q 400a contains an identifier of the cell of the mobile communication network 105 to which the aggregated cell-level data refers;
- the field data_type 410 of the quadruple q 400a contains an indication of the nature, type of the respective aggregated cell-level data (e.g., number of users, phone traffic, number of calls, etc.);
- the field t_interval 415 of the quadruple q 400a contains an indication of the time interval t=[$t_{start}$, $t_{stop}$] to which the cell-level data is referred (e.g., a time interval of 15 minutes from 17:00 to 17:15), and
- the field cell_data_value 420 of the quadruple q 400a contains the value of the aggregated cell-level data in the time interval specified in the field t_interval 415.

The field data_type 410 of the quadruple q 400a may also be absent. The presence of the field data_type 410 can be useful for avoiding any possible confusion in those cases in which the system 100 is used to process aggregated cell-level data of different nature and/or when the system 100 provides the results of the computation to an external user (e.g., an external server) through the User Interface 125.

Aggregated cell-level data of different nature, with different value in the field data_type 410, can be associated with each network cell, relating to the same or to different time intervals as specified in the field t_interval 415. Network cells with different values in the field cell_id 405 may indifferently have associated therewith aggregated cell-level data with same or different value in the field data_type 410.

From a temporal viewpoint, the aggregated cell-level data can reach the system 100 in two ways:
- continuously: for a given network cell and a given type of aggregated cell-level data (as specified in the field data_type 410), the system 100 receives quadruples q 400a with values in the field t_interval 415 distinct and adjacent in time (the end time instant of the i-th received quadruple coincides with the start time instant of the (i+1)-th received quadruple, i.e.: $t_{stop(i)} = t_{start(i+1)}$);
- sporadically: the value in the field t_interval 415 of the quadruples q 400a relating to a certain network cell (as specified in the field cell_id 405) and a given type of aggregated cell-level data (as specified in the field data_type 410) are separated and not adjacent in time (between the end time instant of the i-th time interval and the start time instant of the successive, (i+1)-th time interval there is a certain time: $t_{stop(i)} < t_{start(i+1)}$).

For the purposes of the present disclosure, the system 100 requests to the UE (possibly, to a subset thereof) that happen to be located in the RoI 300 a periodical estimation of their position. The UE may for example exploit the GPS localization resources integrated therein for calculating their position estimates. The position estimates (hereafter also referred to as "position measurements", since the position estimates are obtained by measuring one or more characteristics of radio signals received by the UE from the radio base stations, from GPS satellites or other GNSS, etc., depending on the localization technology adopted) are arranged as t-uples, e.g. triplets 400b of the type m=(UE_id, position (x,y), timestamp), depicted in FIG. 4B, where:
- the field UE_id 425 of the triplet 400b contains an indication of a univocal identifier of the UE that calculated and sent the respective position estimate. For the purposes of the present disclosure the value to be put in the field UE_id 425 may be selected between one or more among the International Mobile Equipment Identity—IMEI—, the International Mobile Subscriber Identity—IMSI—and the Mobile Subscriber ISDN Number—MSISDN—code;
- the field position (x,y) 430 of the triplet 400b contains an indication of the geographic position (longitude and latitude) estimated by the UE, i.e., the value of the position estimate, expressed in any system of geographic coordinates (e.g., WGS84), and the field timestamp 435 of the triplet 400b contains the indication of the time instant at which the position estimate was calculated/determined.

The field UE_id 425 may also be absent. If present, this field allows optimizing some performances of the system 100, as described later on. In one embodiment of the present disclosure, the value in the field UE_id 425 may be provided not in clear, e.g. as an encrypted information in order to ensure the privacy of the UE owner. In other words, if the need arises, the information (i.e., the identity of an individual corresponding to the UE whose univocal identifier is specified in the field UE_id 425) may be encrypted/decrypted by implementing a suitable encryption/decryption algorithm, or a cryptographic hash function such as for example the algorithm SHA256 described in "Secure Hash Standard (SHS)", National Institute of Standards and Technology FIPS—180-4, Mar. 6, 2012. In this way, the identity of the individual is not in clear, being replaced by a non-intelligible pseudonym.

The system 100 can perform the distribution of the aggregated cell-level data on the tessellation 310 of the RoI 300 either in real-time or a-posteriori, in both cases exploiting quadruples q 400a arriving at the system 100 either continuously or sporadically. In real-time operation, the quadruples q 400a are processed as soon as they reach the system 100, whereas in a-posteriori operation the quadruples q 400a that reach the system 100 can be stored in the Repository 115 to be processed by the system 100 at a later time.

Figure 5:
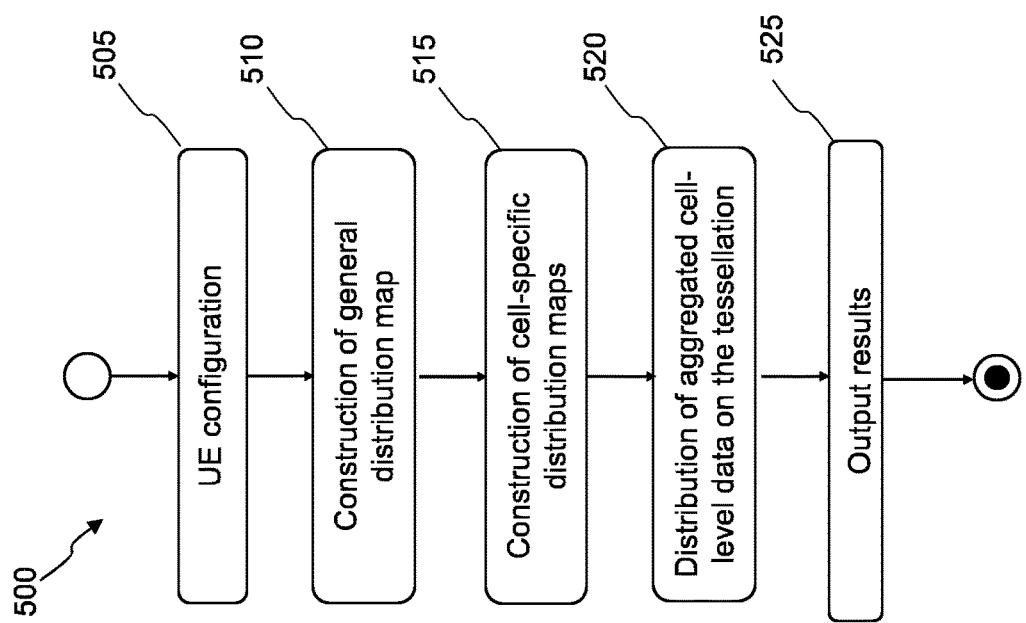
FIG. 5 shows a high-level flowchart of an embodiment of a method according to the present disclosure.

Referring to FIG. 5, a procedure 500 according to an embodiment of the present disclosure for distributing the aggregated cell-level data on the tiles 315 of the tessellation 310 of the RoI 300 comprises four main steps:

step 505: configuration of those UE that will have to calculate and provide to the system 100 estimates of their position;

step 510: construction of a general distribution map;

step 515: construction of a cell-specific distribution map, and step 520: distribution of the cell-level data on the tiles 315 of the tessellation 310.

Optionally, the result of the processing (i.e., the distribution of the cell-level data on the tessellation 310 of the RoI 300) can be provided in output to an external user (step 525).

It is pointed out that the term "map" used herein in connection with the general distribution map and the cell-specific distribution map should be not be intended as a geographic map, rather the term shall be intended as a tool that associates one or more numerical values (obtained by processing the aggregated cell-level data) to entities (like the tiles 315 of the tessellation 310) representing portions of the territory.

Figure 6:
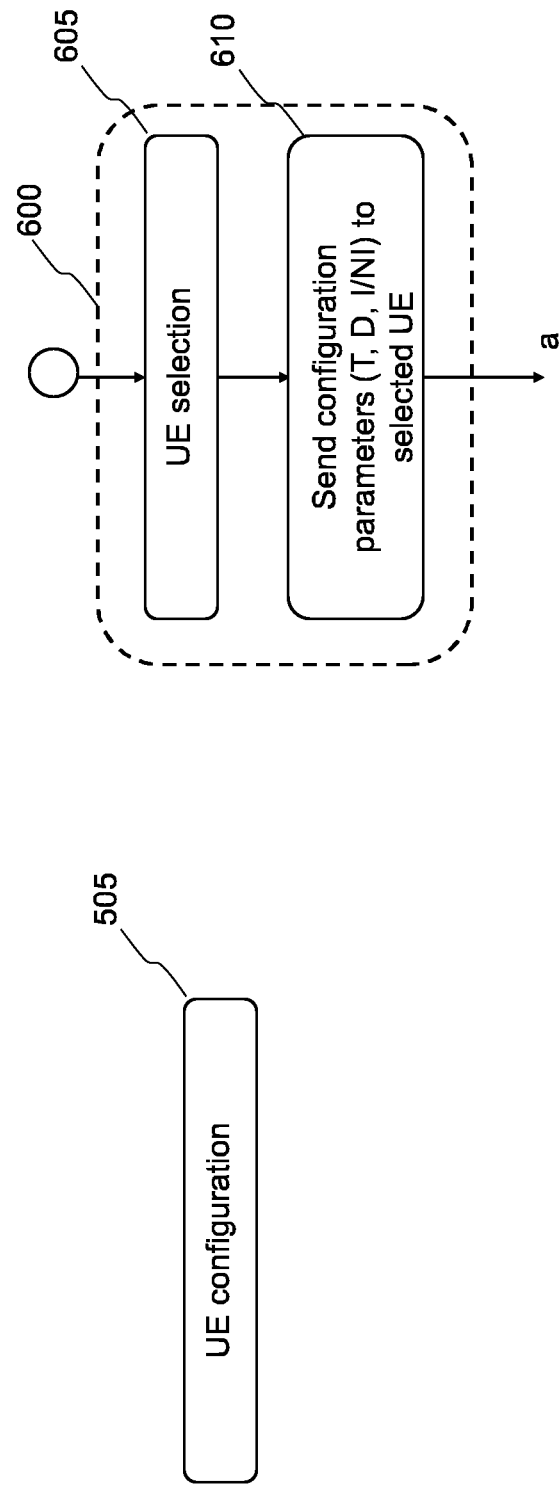
FIG. 6 shows a more detailed flowchart of a step of UE configuration of the flowchart of FIG. 5.

In greater detail, referring to FIG. 6, in step 505 of the procedure 500 of configuration of the UE (the step 505 of FIG. 5 is denoted as 600 in FIG. 6) the system 100 selects the UE to be included in a set of UE which will have to calculate and provide to the system 100 respective position estimates (step 605). Then, the Localization Manager 200, in particular the Communication Manager 205, sends to the selected UE an indication of the time interval MP=[$MP_{start}$, $MP_{stop}$] during which the measurement campaign (to calculate the position estimates) will have to be carried out (e.g.: 24 hours from 00:00 to 24:00 of a specific day, etc.), an indication of the periodicity D with which the UE will have to estimate their position (e.g., every 30 seconds) and an indication (flag I/NI) of whether the UE will have to send the calculated position estimates to the Position Manager 210 immediately after the position estimates have been calculated (flag I/NI set to value I) or the estimates can be sent by the UE at a later time (flag I/NI set to value NI), preferably before the end of the time interval MP of the measurement campaign, for a real-time or non-real-time processing of the quadruples q 400a, respectively. For a real-time processing of the quadruples q 400a, the UE will be configured by the system 100 to send the respective position estimates to the Position Manager 210 immediately after they have been calculated (flag I/NI set to value I), whereas for a non-real-time processing of the quadruples q 400a the UE will be configured by the system 100 in such a way as to have the possibility to postpone the sending of the respective position estimates to the Position Manager 210, sending them at a later time (flag I/NI set to value NI). In this later case the UE can store the calculated position estimates internally (if the UE have the capabilities to do so) and send them at a later time, possibly before the end of the time interval MP of the measurement campaign. In this way, the triplets m 400b with the position estimates of a generic UE can be transmitted by that UE altogether, or they can be sent exploiting the establishment of communication links for other services: in both cases the transmission is made more efficient; or, in case a UE happens to be in an area not covered by the mobile communication network 105, the UE can wait to return in a covered area and then send the respective position estimates.

The selection of the UE to be inserted in the set of UE which will have to calculate and provide to the system 100 their position estimates and to which the configuration parameters have to be sent, can be accomplished in different ways. One possibility is to send the configuration parameters to all the UE which happen to be within the cells 105b of the mobile communication network 105 inside the RoI 300, for example exploiting a broadcast message. Another possibility is that the administrator of the system 100, possibly in agreement with the operator of the mobile communication network, sends the configuration parameters only to a subset of those UE on the basis of one or more criteria, such as for example:

UE of users which have given to the network operator their consent to activate their localization;

UE of users which have given to the network operator or to the administrator of the system 100 their consent to take part to the measurement campaigns to be performed for the specific purposes of the system 100;

UE of users which, at the subscription of the service contract with the network operator, have declared a residence in a given area (e.g., inside the RoI 300 or inside a specific zone of the RoI 300):

UE of users in respect of which the network operator has determined a residence or a working location in a certain area (based on any of the known techniques, e.g. the technique described in U.S. Pat. No. 9,706,363, disclosing a method for identifying and locating at least one relevant location visited by at least one individual within a geographical area served by a wireless telecommunication network the method including: identifying and clustering events that occurred within a predefined distance from each other and having a similar probability, computing a weight value for each cluster of events identified, comparing the weight value with a threshold weight value, if the weight value is equal to, or greater than, the threshold weight value, identifying the relevant location as belonging to a selected typology of relevant location, and providing an indication of the position of the at least one relevant location based on recorded position data of the events of the cluster, or if the weight value is lower than the threshold weight value, identifying the relevant location as not belonging to the selected typology of relevant location).

The selection of the UE which will have to calculate and provide to the system 100 their position estimates is preferably made with the aim of complying with law prescriptions (e.g., concerning issues of privacy of users) and/or to avoid unnecessary processing by the UE or the system 100 (for example, avoiding to include in the set of UE which are requested to calculate and provide position estimates those UE which are expected to just quickly transit through the RoI 300, and which, if selected, would send position estimates also when they are out of, (far) away from the RoI 300). Additionally, the administrator of the system 100, based on the available hardware/software resources (CPU, RAM, etc.) of the system 100, can decide (e.g., to avoid overloading the system 100, particularly the Localization Manager 200 and the Computation Engine 110) to select, among all the possible UE, a suitably small number of UE. The UE can be selected in a random manner or based on specific requirements for the UE, for example based on the localization features and capabilities of the UE, e.g., in terms of achievable accuracy for the position estimate.

The subsequent steps of the procedure 500 differ depending on whether a real-time processing or a non-real-time processing of the quadruples q 400a is to be performed by the system 100. The two cases are described in the following separately.

Real-Time Processing

Figure 7:
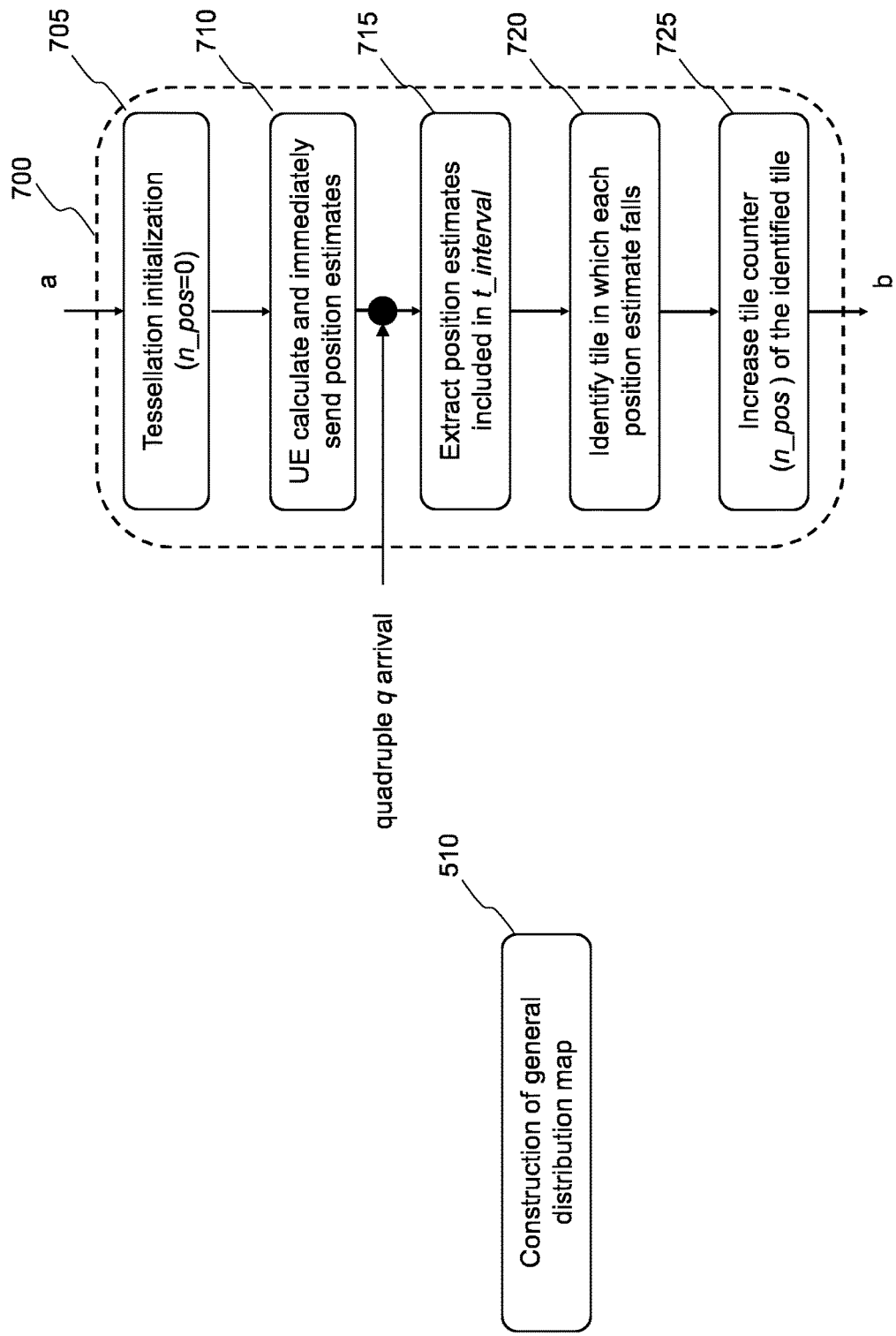
FIG. 7 shows a more detailed flowchart of a step of general distribution map construction of the flowchart of FIG. 5, in a case of real-time processing of the quadruples shown in FIG. 4A.

In an embodiment, the step 510 of construction of the general distribution map, denoted as 700 in FIG. 7, comprises the following operations.

For each tile 315 of the tessellation 310 a counter n_pos is initialized to an initial value, e.g. to 0 (zero); the counter n_pos will be used to count the number of position estimates, received by the selected UE, falling in said tile in a given time interval as specified by the value of the field t_interval 415 in the quadruple q 400a (step 705).

Then, starting from the time instant $MP_{start}$ and till the time instant $MP_{stop}$ of the time interval MP during which the measurement campaign is carried out, the UE selected at step 605 estimate their own geographic position every D seconds and send the calculated position estimates immediately to the Position Manager 210, e.g. in the form of triplets m 400b as depicted in FIG. 4B; the Position Manager 210 stores the received triplets m 400b in the Position Repository 215 (step 710).

When aggregated cell-level data to be distributed on the RoI 300 are received at the system 100, e.g. included in a quadruple q 400a, the Position Manager 210 extracts from the Position Repository 215 all the received triplets m 400b having a value in the field timestamp 435 included in the time interval specified in the value of the field t_interval 415 of the quadruple q 400a and sends the extracted triplets to the Computation Engine 110 (step 715).

The Computation Engine 110 receives from the Position Manager 210 the extracted triplets m 400b and, for each received triplet, based on the geographic coordinates included in the field position (x,y) 430 thereof, it determines in which tile 315 of the tessellation 310 the considered triplet falls (step 720). The Computation Engine 110 increases of a predetermined amount (e.g., 1) the counter n_pos corresponding to the determined tile 315 (step 725). In the case that the geographic coordinates available in the field position (x,y) 430 of the triplet m 400b under consideration are internal to the determined tile 315, there is a univocal assignment of the position of the corresponding UE to that tile; when instead the coordinates available in the field position (x,y) 430 of the triplet m 400b are located on the boundary between two or more tiles 315 of the tessellation 310, there are two possibilities: 1) a first possibility is to randomly select one of the two or more concerned tiles and to increase of the predetermined amount (e.g., 1) the counter n_pos corresponding to the randomly selected tile 315; 2) another possibility is to increase the counters n_pos associated to all the two or more concerned tiles 315 of the predetermined amount (e.g., 1) divided by the number of concerned tiles 315. The choice between one or the other of these two possibilities can for example be made by the administrator of the system 100, through the Administrator Interface 120.

Once all the triplets m 400b relating to the time interval t_interval 415 of the quadruple q 400a have been analysed by the Computation Engine 110, the general distribution map is obtained that associates, with each tile 315 of the tessellation 310, a value of the respective counter n_pos equal to the number of position estimates which have been received from the UE and which have geographic coordinates in the field position (x,y) 430 falling in said tile 315.

Figure 8:
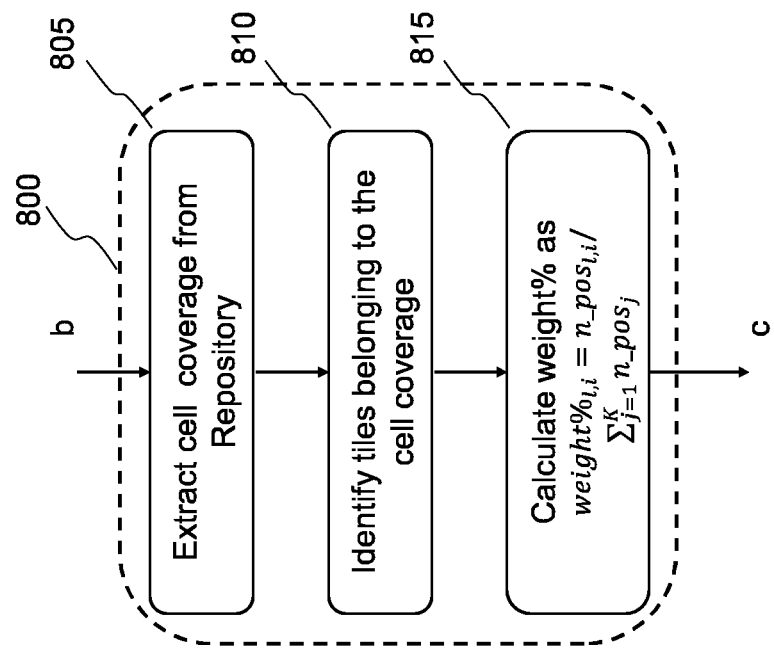
FIG. 8 shows a more detailed flowchart of a step of a cell-specific or cell-level distribution map construction of the flowchart of FIG. 5.
Figure 8:
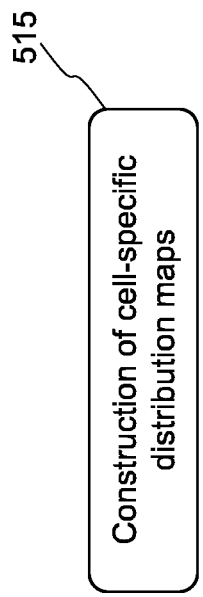

After building the general distribution map, the step of construction of the cell-specific distribution maps 515 starts. This step is schematically depicted in the flowchart of FIG. 8 where it is denoted 800.

Looking at the value in the field cell_id 405 of the quadruple q 400a, the Computation Engine 110 identifies the network cell $c_1$ to which the aggregated cell-level data relate, extracts from the Repository 115 the corresponding coverage (step 805) and determines all the K tiles 315 of the tessellation 310 that belong to the coverage area of the cell $c_1$ (step 810). One way to determine that a tile 315 belongs to the coverage area of the cell $c_1$ is by assessing that the coordinates of the center of gravity of the tile 315 fall inside the coverage area of the cell $c_1$, or that a given percentage (fraction) of the tile surface, for example a predetermined % value, falls inside the coverage area of the cell $c_1$. The choice of the specific criterion/criteria for considering that a tile 315 belongs to the coverage area of the cell $c_1$ is for example made by the administrator of the system 100 through the Administrator Interface 120.

For each of the K tiles determined at step 810, the Computation Engine 110 calculates a value weight % as the ratio between the numerical value of the counter n_pos for that tile 315 and the sum of the numerical values of the counters n_pos for all the K tiles determined at step 810:

$$\text{weight \%}_{l,i} = n\_pos_{l,i} / \Sigma_{j=1}^{K} n\_pos_j \qquad \text{(Equation 1)}$$

with the index i=1, . . . , K (step 815). The result of this operation is the cell-specific distribution map for the cell $c_1$, which establishes a correspondence between each tile 315 of the tessellation 310 and a weight value calculated as in Equation 1. Such a weight value can be regarded as the probability that a user of a UE that is located in the coverage area of the cell $c_1$ is specifically located in the i-th tile 315 of the tessellation 310.

Figure 9:
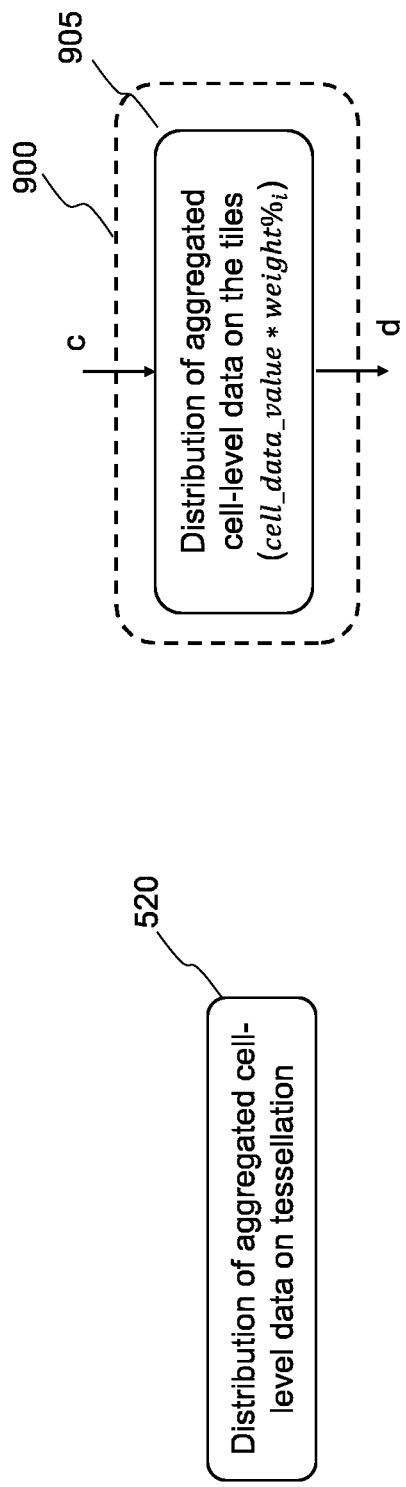
FIG. 9 shows a more detailed flowchart of a step of the flowchart of FIG. 5 of distribution of the aggregated cell-level data on the tiles of the tessellation shown in FIG. 3B.

At this point, the aggregated cell-level data are distributed on the tessellation 310 (step 520, denoted 900 in FIG. 9). The aggregated cell-level data value contained in the field cell_data_value 420 of the quadruple q 400a is distributed on each of the K tiles of the tessellation 310 identified at step 810 by multiplying the aggregated cell-level data value contained in the field cell_data_value 420 by the value weight % of each tile 315 (step 905) calculated as in Equation 1.

Non-Real-Time Processing

Figure 10:
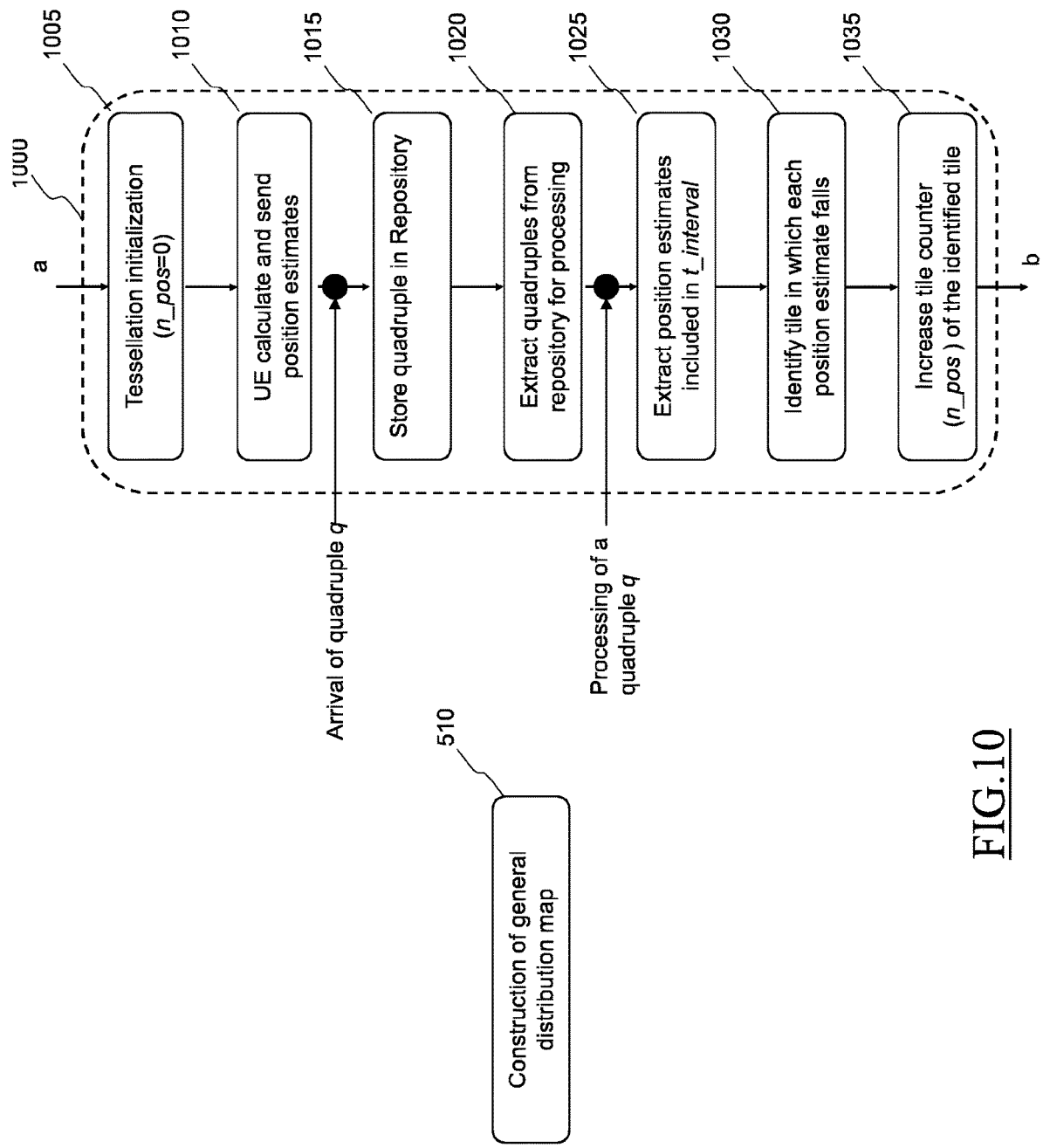
FIG. 10 shows a more detailed flowchart of a step of general distribution map construction of the flowchart of FIG. 5, in a case of non-real-time processing of the quadruples shown in FIG. 4A.

In this case, as shown in FIG. 10, during the step 510 of construction of the general distribution map (denoted as 1000 in FIG. 10), the quadruple q 400a arriving at the system 100 is inserted in the Repository 115 (step 1015) to be then retrieved when it will have to be processed (at step 1020). All the operations (steps 1005, 1010 of the procedure 1000) that precede steps 1015 and 1020 and the operations (steps 1025, 1030 and 1035) that follow steps 1015 and 1020, resulting in the construction of the general distribution map, as well as the step (step 520, 900) of distribution of the aggregated cell-level data on the tessellation 310 are unaltered compared to the corresponding operations performed in the case of real-time processing described in the foregoing.

By processing the quadruples q 400a not in real-time, it is not necessary for the UE to send the respective position estimates to the Position Manager 210 after they are calculated: the UE can locally store the calculated position estimates and send them to the Position Manager 210 at a later time, preferably before the end of the time interval MP during which the measurement campaign is carried out (so as to keep position estimates calculated in different measurements campaigns separated, to avoid any risk of confusing them). The UE can transmit the triplets m 400b all together, in a single block, or the UE can exploit of the opening of communication links for other services; in both cases, the transmission of the triplets is made more efficient. This is also useful in cases when the UE are momentarily in an area not covered by the mobile communication network: the triplets can be sent to the Position Manager 210 when the UE re-enter in an area of network coverage.

In an embodiment of the present disclosure, the system 100 can process in real-time, or not in real-time, the quadruples q 400a arriving at the system 100 during the time interval MP=[$MP_{start}$, $MP_{stop}$] in which the measurement campaign is conducted. In this case, the value of the field t_interval 415 of the quadruples q 400a to be processed is internal to the time interval MP, both in terms of date (day, month, year) and in terms of time (hour, minutes, seconds).

In another embodiment, the system 100 can also be used to process in real-time, or not in real-time, the quadruples q 400a that arrive at the system 100 after the end of the time interval MP during which the measurement campaign is carried out. In this case, during step 715, the Position Manager 210, when extracting from the Position Repository 215 all the triplets m 400b which have a value of the file timestamp 435 comprised in the value of the field t_interval 415 of the quadruple q 400a, only takes into consideration the time (hour, minutes, seconds), not the date (day, month, year), which will be different. In this way the system 100 allows processing—either in real-time or not—quadruples q 400a relating to several days or weeks using the position estimates of just one measurement campaign performed previously (e.g., during 24 hours). All the remaining operations remain unaltered, as described in the foregoing.

In an embodiment, when the time interval MP comes to the end, the system 100 performs the operations of steps 715, 720 and 725, for real-time processing, or 1025, 1030 and 1035, for non-real-time processing, for all the time intervals adjacent and having constant and predefined time duration (e.g., 5 minutes, 10 minutes, 15 minutes, etc.) within the time interval MP, building, for each such time interval, a general distribution map. When a quadruple q 400a to be processed (either in real-time or not) reaches the system 100, said quadruple having a value in the field t_interval 415 coincident with one of the predefined time durations, the computation engine 110 can perform the operations (step 515, 800) of construction of the cell-specific distribution map using the general distribution map already calculated for that specific time interval specified in the field t_interval 415. This allows reducing the processing time of a quadruple and, possibly, reducing the amount of data to be stored (it is possible to store the general processing maps calculated on specific time intervals and discard the triplets m 400b used for the calculation of such general distribution maps).

If the system 100 is exploited for distributing aggregated cell-level data on two or more RoIs 300 at a time, in the operations at step 715 or 1025 the Position Manager 210 can look and take into consideration, in addition to the field timestamp 435 of the triplet 400b containing the position estimate, also the identifier, contained in the field UE_id 425 of the triplet, of the UE that calculated the position estimate (if the field UE_id 425 is present) and retrieve from the Position Repository 215 only the position estimates coming from those UE that, with the operation at step 605, have been identified to be in a certain one of the RoIs 300.

If, while performing the operations at step 715 or 1025, it is determined that no useful triplets m 400b are stored in the Position Repository 215, even in presence of a non-zero value in the field cell_data_value 420 of the quadruple q 400a being processed, the Position Manager 210 extracts the triplets included in the preceding or successive time interval (as specified by the administrator of the system 100 through the Administrator Interface 120) closer to, and of equal duration as, the time interval under consideration.

In order to reduce the processing time of the system 100 or to reduce the need of communication bandwidth for the communication between the Position Manager 210 and the computation engine 110 when the two modules are physically separated from each other, the administrator of the system 100 can decide to reduce the number of, e.g. to decimate, the position estimates m 400b to be processed by the Position Manager 210 before the transmission to the computation engine 110 (operation at step 715 or 1025), or to be processed by the computation engine 110 before starting the processing (operations at step 720 or 1030). In this way, just one triplet m 400b (i.e., just one position estimate) is taken into consideration out of a number n of triplets m 400b (i.e., n position estimates). Such a reduction in number of the position estimates to be subject to processing can be operated on a per-user (per-UE) basis, in case the field UE_id 425 is present in the triplets 400b (this means that one measurement is retained for each value of the field UE_id), or globally for all the position estimates (this means that one measurement is retained every n measurements, irrespective of the UE—identified by the value in the field UE_id—that performed the measurements).

For similar reasons, the Position Manager 210 or the Computation Engine 110 can be configured by the administrator of the system 100 (through the Administrator Interface 120) to calculate, from the set of position estimates extracted during the operations at step 715 or 1025, an average position for each UE, if the field UE_id 425 is present, and to exploit this single average position in the operations at step 720 or 1030.

The solution according to the present disclosure is independent from the specific localization technique employed by the UE for estimating their positions: it is for example possible to employ a technique based on mobile radio technology, standard or not (Cell-Id, TOA, based on radio signal strength measurements, etc.), or a technique based on short-range communication capabilities of the UE (e.g., Wi-Fi, Bluetooth, etc.) or a satellite-localization technique (GNSS, such as GPS, Galileo, etc.).

In an embodiment of the present disclosure, the UE can send, within the triplets m 400*b*, for example within the field position (x,y) 430 of the triplets m 400*b*, also an indication of the uncertainty, or of the accuracy, associated with the position estimates. The Computation Engine 110, when performing the operations at step 720 or 1030, can decide to use only those position estimates that are accompanied by a value of uncertainty lower than a predefined uncertainty threshold, for example set by the administrator of the system 100 through the Administrator Interface 120. The uncertainty threshold can depend on the characteristic size of the generic tile 315 of the tessellation 310 (for example, in case of square tiles 315, the uncertainty threshold can be set equal to half the length of the tile side; for circular tiles, the uncertainty threshold can be set equal to the radius of the circumference delimiting the tile).

In an embodiment of the present disclosure, the operations at step 720 or 1030 can be cooperatively carried out also with the participation of those UE that are not capable of estimating their position (either because they do not have a suitable software installed or because the software available to them always provided results affected by an a-priori unacceptable uncertainty). These can be UE that are only capable of measuring the characteristics of the radio signal received from the radio base stations 105*a* (e.g., serving radio base station, received radio signal power, adjacent radio base stations, etc.). The Position Manager 210, upon receiving these measurements, calculates the position of the UE exploiting a localization algorithm and stores the results in the Position Repository 215 (steps 710 or 1010).

The system 100 can be implemented by means of an app/server architecture, which provides for having an app installed on the UE which dialogues with a remote server using, at high level, Internet protocols and, at a lower level, the User-plane of the mobile communication network 105. Alternatively, the solution according to the present disclosure can be actuated exploiting, at least in part, messages and functions of the MDT (Minimization of Drive Tests) technology, introduced in the Release 10 of the 3GPP standard for UMTS and LTE (see e.g. the 3GPP TS 37.320). For example, in case of immediate transmission (flag I/NI set to I) of the position estimates, it is possible to exploit the functionality called "Immediate MDT", whereas in case of delayed transmission (flag I/NI set to NI) it is possible to exploit the functionality called "Logged MDT".

It should be noted that the solution according to the present disclosure may be implemented by using any kind of mobile communication network or wireless computer network (such as WLANs), operating in the RoI 300, provided that the UE of the individuals (at least one subset of the UE present in the 300) are capable to connect to such networks and are capable of estimating their position by exploiting any known localization technique (such as the GPS).

In the foregoing, exemplary embodiments of the solution according to the present disclosure has been described in detail. Those skilled in the art will recognize that several modifications to the described embodiments are possible, as well as other embodiments, without departing from the protection scope set out in the appended claims.

The invention claimed is:

1. A method, implemented by a data processing system, for distributing, across a territory, cell-level aggregated data, said cell-level aggregated data being data which are available from a mobile communication network in a form that is aggregated at the level of single network cells of the mobile communication network, the method comprising:
    subdividing a geographic area of interest in geographic area portions;
    causing mobile communication terminals served by the mobile communication network and situated in the geographic area of interest to calculate respective geographic position estimates and provide the calculated geographic position estimates to the data processing system;
    distributing an overall number of geographic position estimates received from the mobile communication terminals on the geographic area portions by assigning to each geographic area portion a respective number of geographic position estimates corresponding to geographic positions estimates falling within said geographic area portion;
    receiving cell-level aggregated data relating to at least one network cell;
    for each of said at least one network cell:
    determining, among said geographic area portions, covered geographic area portions falling within a coverage area of said network cell;
    distributing the cell-level aggregated data of the network cell on each of the determined covered geographic area portions according to a respective distribution factor which depends on said respective number of geographic position estimates assigned to the covered geographic area portion, and
    generating a distribution map of the cell-level aggregated data in which to each of said geographic area portions of the geographic area of interest a respective quota of the cell-level aggregated data is assigned, said respective quota being obtained by said distributing the cell-level aggregated data of the network cell on each of the determined covered geographic area portions according to the respective distribution factor.

2. The method of claim 1, wherein said cell-level aggregated data comprise at least one among: number of users of mobile communication terminals in the network cell, phone traffic in the network cell, number of calls in the network cell.

3. The method of claim 2, wherein said cell-level aggregated data comprise at least one among:
    an aggregated cell-level counter of the mobile communication network of the traffic carried by the individual network cell;
    an aggregated cell-level counter of the mobile communication network of the number of new calls established through the individual network cell;
    an aggregated cell-level counter of the mobile communication network of the number of new calls received at the individual network cell;
    an aggregated cell-level counter of the mobile communication network of the overall number of SMS messages received and transmitted in the individual network cell;
    an aggregated cell-level counter of the mobile communication network of the number of SMS messages received at the individual network cell;
    an aggregated cell-level counter of the mobile communication network of the number of SMS messages transmitted in the individual network cell;
    an aggregated cell-level counter of the mobile communication network of the number of "location update" procedures carried out in the individual network cell;

an aggregated cell-level counter of the mobile communication network of the number of successful handovers in exit from a generic network cell towards each of the adjacent cells;

an aggregated cell-level counter of the mobile communication network of the number of successful handovers in entrance in a generic network cell from each of the adjacent cells.

4. The method of claim 2, wherein said cell-level aggregated data comprise data obtained by aggregating Call Data Records, which derive from interactions of the mobile communication terminals with the mobile communication network, said data obtained by aggregating Call Data Records comprising:

total number of users present in a network cell, possibly discriminated by their nationality;

number of users having residence/domicile/working place inside a network cell;

number of users in a network cell, possibly discriminated by their nationality, that can be classified as tourists/walkers or in transit through the cell;

number of users in a network cell, possibly discriminated by their nationality, that can be classified as "Machine-to-machine" users, on the basis of parameters of the mobile communication terminals;

number of users in a network cell, possibly discriminated by their nationality, that can be classified as "individuals/human beings", on the basis of parameters of the mobile communication terminal.

5. The method of claim 1, wherein said causing mobile communication terminals served by the mobile communication network and situated in the geographic area of interest to calculate respective geographic position estimates and provide the calculated geographic position estimates to the data processing system comprises selecting, among all the mobile communication terminals served by the mobile communication network and situated in the geographic area of interest, a subset of selected mobile communication terminals according to a selection criterion comprising at least one among:

mobile communication terminals of users which have given their consent to activate their geographic localization;

mobile communication terminals of users which have given their consent to take part to measurement campaigns to be performed for purpose of distributing, across a territory, cell-level aggregated data;

mobile communication terminals of users which, at subscription, have declared a residence in a certain area inside the geographic area of interest;

mobile communication terminals of users in respect of which an operator of the mobile communication network has determined a residence or a working location in a certain area inside the geographic area of interest.

6. The method of claim 5, comprising configuring the subset of selected mobile communication terminals, said configuring comprising providing to the selected mobile communication terminals at least one among:

an indication of a time interval during which the selected mobile communication terminals will have to calculate the respective geographic position estimates;

an indication of a periodicity with which the selected mobile communication terminals will have to calculate the respective geographic position estimates;

an indication of whether the selected mobile communication terminals will have to provide to the data processing system the respective calculated geographic position estimates immediately after the respective geographic position estimates have been calculated or the respective calculated geographic position estimates can be provided to the data processing system at a later time after they have been calculated.

7. The method of claim 1, wherein determining covered geographic area portions falling within a coverage area of that network cell comprises:

obtaining a coverage area of that network cell;

determining which of said geographic area portions belong to the coverage area of the network cell, wherein said determining comprises at least one among:

assessing which of said geographic area portions have geographic coordinates of a center of gravity thereof falling inside the coverage area of the network cell;

assessing which of said geographic area portions fall, for a given percentage of their area, inside the coverage area of the network cell.

8. The method of claim 1, wherein said assigning to each geographic area portion a respective number of geographic position estimates corresponding to geographic positions estimates falling within said geographic area portion comprises, in case a geographic position estimate falls on a boundary between at least two geographic area portions:

either randomly selecting one of the at least two geographic area portions to be assigned to that geographic position estimate, or assigning to each of said at least two geographic area portions a fraction of said geographic position estimate equal to 1 divided by the number of said at least two geographic area portions.

9. The method of claim 1, wherein said cell-level aggregated data is received in the form of t-uples, wherein each t-uple comprises a field containing an identifier of the network cell to which the aggregated data refers, a field containing an indication of a time interval to which the aggregated data is referred, a field containing the value of the aggregated data in said time interval, and optionally a field containing an indication of the nature, type of the aggregated data.

10. The method of claim 1, wherein said calculated geographic position estimates are provided in the form of t-uples, wherein each t-uple comprises: a field containing an indication of the geographic position estimated by the mobile communication terminal, expressed in any system of geographic coordinates, a field containing an indication of the time instant at which the geographic position estimate has been calculated, optionally a field containing an indication of a univocal identifier of the mobile communication terminal that calculated and sent the geographic position estimate.

11. A data processing system comprising:

at least one processor configured to subdivide a geographic area of interest in geographic area portions;

cause mobile communication terminals served by the mobile communication network and situated in the geographic area of interest to calculate respective geographic position estimates and provide the calculated geographic position estimates to the data processing system:

distribute an overall number of geographic position estimates received from the mobile communication terminals on the geographic area portions by assigning to each geographic area portion a respective number of geographic position estimates corresponding to geographic positions estimates falling within said geographic area portion;

receive cell-level aggregated data relating to at least one network cell;

for each of said at least one network cell:
- determine, among said geographic area portions, covered geographic area portions falling within a coverage area of said network cell;
- distribute the cell-level aggregated data of the network cell on each of the determined covered geographic area portions according to a respective distribution factor which depends on said respective number of geographic position estimates assigned to the covered geographic area portion, and
- generate a distribution map of the cell-level aggregated data in which to each of said geographic area portions of the geographic area of interest a respective quota of the cell-level aggregated data is assigned, said respective quota being obtained by said distributing the cell-level aggregated data of the network cell on each of the determined covered geographic area portions according to the respective distribution factor.

* * * * *